(12) United States Patent
Stephens et al.

(10) Patent No.: US 9,555,273 B2
(45) Date of Patent: Jan. 31, 2017

(54) FOAM TEST SYSTEM FOR FIREFIGHTING VEHICLE

(71) Applicant: E-One, Inc., Ocala, FL (US)

(72) Inventors: Leroy C. Stephens, Belleview, FL (US); Rickie W. White, Summerfield, FL (US)

(73) Assignee: E-One, Inc., Ocala, FL (US)

( * ) Notice: Subject to any disclaimer, the term of this patent is extended or adjusted under 35 U.S.C. 154(b) by 143 days.

(21) Appl. No.: 14/173,899

(22) Filed: Feb. 6, 2014

(65) Prior Publication Data

US 2014/0238703 A1  Aug. 28, 2014

Related U.S. Application Data

(60) Provisional application No. 61/768,453, filed on Feb. 23, 2013.

(51) Int. Cl.
| | | |
|---|---|---|
| *A62C 37/50* | (2006.01) | |
| *G01F 1/00* | (2006.01) | |
| *G01F 1/56* | (2006.01) | |
| *A62C 27/00* | (2006.01) | |
| *G01F 25/00* | (2006.01) | |
| *A62C 5/02* | (2006.01) | |

(52) U.S. Cl.
CPC ............... *A62C 37/50* (2013.01); *G01F 1/00* (2013.01); *G01F 1/56* (2013.01); *A62C 5/02* (2013.01); *A62C 27/00* (2013.01); *G01F 25/0007* (2013.01)

(58) Field of Classification Search
CPC ........... A62C 27/00; A62C 37/50; A62C 5/02; G01F 1/00; G01F 1/56; G01F 25/0007
USPC ......................................................... 169/24
See application file for complete search history.

(56) References Cited

U.S. PATENT DOCUMENTS

| | | | |
|---|---|---|---|
| 5,881,818 A | 3/1999 | Lee et al. | |
| 7,080,694 B2 * | 7/2006 | Boyle | A62C 37/50 169/14 |
| 7,513,315 B2 * | 4/2009 | Boyle | A62C 5/02 169/16 |
| 2006/0107757 A1 | 5/2006 | Kudo et al. | |

FOREIGN PATENT DOCUMENTS

| | | |
|---|---|---|
| EP | 2457643 A1 | 5/2012 |
| WO | 03/042092 A1 | 5/2003 |

OTHER PUBLICATIONS

Austrian Office Action dated Feb. 23, 2015 in related Austrian Patent Application No. A 50134/2014; 4 pages.

* cited by examiner

*Primary Examiner* — Christopher Kim
(74) *Attorney, Agent, or Firm* — Hovey Williams LLP (57) ABSTRACT

Systems and methods for determining the accuracy of a foam addition system on a firefighting vehicle are disclosed. The methods may include measuring the amount of a test water stream flowing through a foam metering device.

15 Claims, 3 Drawing Sheets

FOAM TEST SYSTEM FOR FIREFIGHTING VEHICLE

RELATED APPLICATIONS

This application claims the priority benefit under 35 U.S.C. §119(e) of U.S. Provisional Patent Application Ser. No. 61/768,453 entitled "Foam Test System for Firefighting Vehicle," filed Feb. 23, 2013, the entire disclosure of which is incorporated herein by reference.

FIELD OF THE INVENTION

The present invention relates generally to firefighting vehicles. More particularly, the invention concerns systems and methods for testing the accuracy of a foam addition system utilized by a firefighting vehicle.

BACKGROUND

Certain firefighting vehicles can be equipped with a foam addition system that can add a foam concentrate to a water stream and thereby discharge a foam/water mixture in order to suppress or prevent a fire. Generally, it is desirable to test the accuracy of a firefighting vehicle's foam addition system to ensure that the correct amount of foam is being added to the water stream so that the foam/water mixture being discharged has the proper amount of foam. Certain current methods used to test the accuracy of a foam addition system can involve the actual discharge of a foam/water mixture into the environment. However, the discharge of certain fire retardant foam compositions into the environment may have negative environmental effects. Therefore, there is a need for systems and methods that can test the accuracy of a foam addition system without actually discharging any foam into the environment during the testing procedure.

SUMMARY

In one embodiment of the present invention, a method of testing the accuracy of a firefighting vehicle's foam addition system is provided that includes the steps of (a) operating the foam addition system in a normal mode where a foam concentrate stream flows through a foam metering device and is thereafter mixed with a first tank water stream supplied by a water tank on the vehicle, (b) operating the foam addition system in a test mode where a test water stream supplied by the water tank flows through the foam metering device and is thereafter mixed with a second tank water stream supplied by the water tank, and (c) during at least a portion of step (b) measuring the amount of the test water stream flowing through the foam metering device.

In another embodiment of the present invention, a foam test system for testing the accuracy of a firefighting vehicle's foam addition system is provided. The firefighting vehicle is equipped with a water tank for storing water, a foam tank for storing a liquid foam concentrate, a foam/water mixing device for combining the foam concentrate with the water, and a foam metering device for metering flow of the foam concentrate from the foam tank to the foam/water mixing device. The system includes a flow control system shiftable between (i) a normal mode where fluid flow from the foam tank to the foam metering device is permitted and fluid flow from the water tank to the foam metering device is prevented, and (ii) a test mode where fluid flow from the water tank to the foam metering device is permitted and fluid flow from the foam tank to the foam metering device is prevented. The system further includes a flow meter for measuring the amount of water passed through the foam metering device when the flow control system is in the test mode.

In yet another embodiment of the present invention, a firefighting vehicle is provided that includes a water tank for storing water, a foam tank for storing a liquid foam concentrate, a foam/water mixing device for combining the foam concentrate with the water, and a foam metering device for metering flow of the foam concentrate from the foam tank to the foam/water mixing device. The firefighting vehicle further includes a flow control system shiftable between (i) a normal mode where fluid flow from the foam tank to the foam metering device is permitted and fluid flow from the water tank to the foam metering device is prevented, and (ii) a test mode where fluid flow from the water tank to the foam metering device is permitted and fluid flow from the foam tank and the foam metering device is prevented. The firefighting vehicle also includes a flow meter for measuring the amount of water passed through the foam metering device when the flow control system is in the test mode.

BRIEF DESCRIPTION OF THE FIGURES

Embodiments of the present invention are described herein with reference to the following drawing figures, wherein.

DETAILED DESCRIPTION

Figure 1:
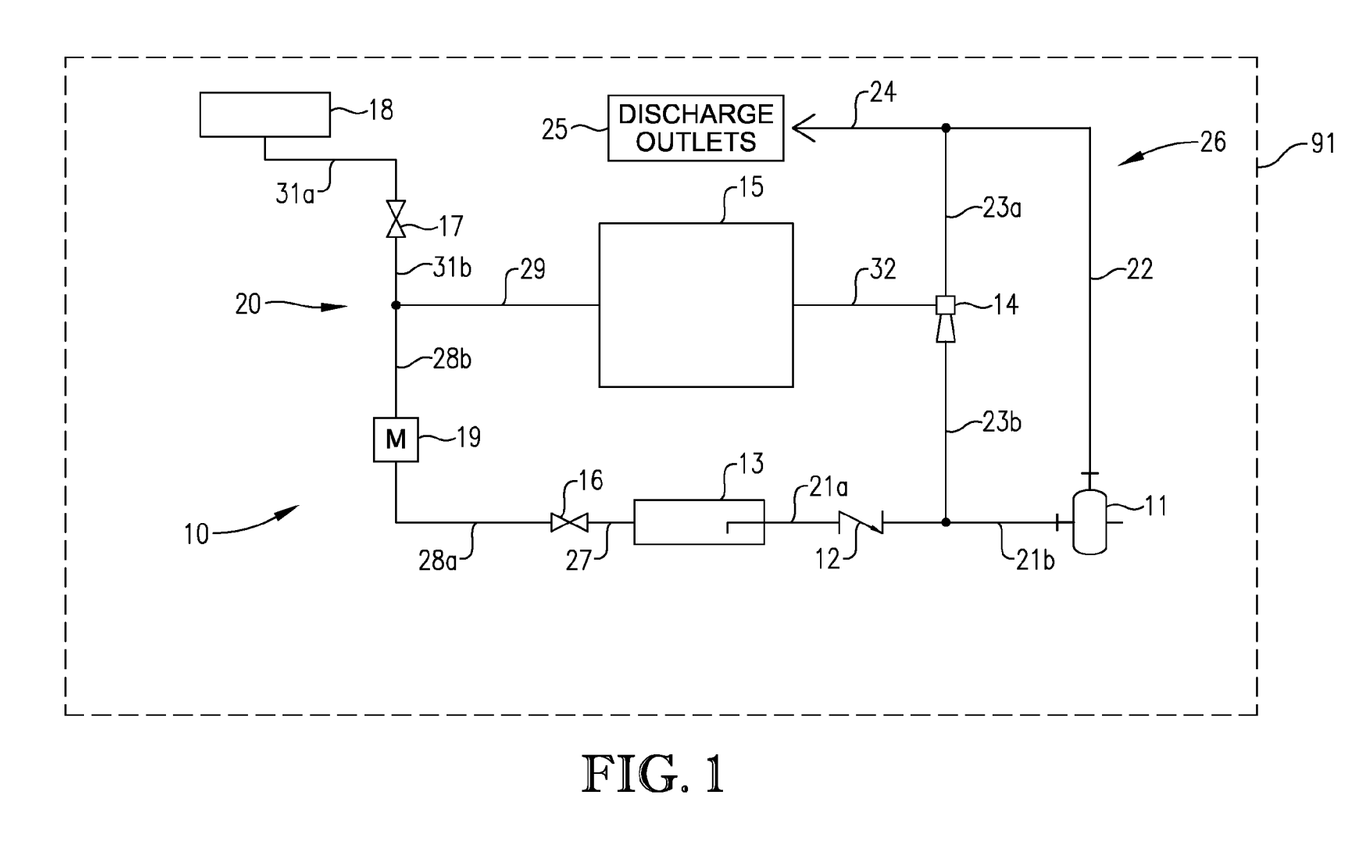
FIG. 1 is a schematic diagram of an internal foam test system in accordance with one embodiment of the present invention, particularly showing a water tank, a pump, a flow control system, a foam metering device, and a flow meter, all mounted on a firefighting truck.

FIG. 1 depicts an internal foam test system 10 for a firefighting vehicle 91 in accordance with one embodiment of the present invention. The firefighting vehicle 91 can be any type of firefighting vehicle known to one skilled in the art, such as, for example, a firefighting truck. In certain embodiments, the firefighting vehicle 91 may be equipped with a foam addition system 26. The foam addition system 26 may be any type of foam addition system known to one skilled in the art, such as, for example, an around-the-pump ("ATP") foam addition system.

In certain embodiments, a firefighting vehicle 91 having a foam addition system 26 may be equipped with a water tank 13, a foam tank 18, a foam metering device 15, a foam/water mixing device 14, and a pump 11. The water tank 13 and the foam tank 18 may be any type of tanks that are capable of being mounted onto a firefighting vehicle 91, and specific tanks can be chosen by one skilled in the art for a particular purpose. The foam metering device 15 can be any device known to one skilled in the art that is capable of controlling the flow of a foam concentrate from the foam tank 18 into the foam/water mixing device 14. In certain embodiments, the foam metering device 15 may include a metering valve. The foam/water mixing device 14 may include any type of mixing device known to one skilled in the art that is capable of mixing foam concentrate with a stream of water supplied by a water tank 13, such as, for example, an eductor.

In certain embodiments, the foam addition system 26 may be an ATP foam addition system. In such embodiments, the foam addition system 26 may include a tank water stream, which can include water from the water tank 13 that enters into a conduit 21a, proceeds past a check valve 12, through a conduit 21b, through the pump 11, and then proceeds through conduits 22 and 23a, and through the foam/water mixing device 14. The check valve 12 and the pump 11 are components known to one skilled in the art and specific types of these components can be chosen by one skilled in the art for a particular purpose.

In one or more embodiments, a foam concentrate, e.g., in the form of a liquid, may exit the foam tank 18 and enter conduit 31a, flow through the foam concentrate valve 17, through conduits 31b and 29, and flow into the foam metering device 15, which may meter the foam concentrate into conduit 32. In such embodiments, water, e.g., water from the tank water stream, that is passing through the foam/water mixing device 14 may draw foam concentrate from the foam metering device 15 and/or conduit 32 into the foam/water mixing device 14 to thereby form a foam and water mixture. In such embodiments, this foam and water mixture may then proceed through conduits 23b and 21b, through the pump 11, and through conduits 22 and 24, and ultimately be discharged via at least one discharge outlet 25. In certain embodiments, the discharge outlets 25 may include one or more under-truck nozzles, one or more hand-lines, and/or one or more turrets. In various embodiments, the foam and water mixture that is discharged may include foam in an amount of at least 0.1, 0.5, or 1 (v/v) percent, and/or not more than 15, 12, or 10 (v/v) percent.

The foam concentrate may be any type of foam that can be used to suppress or prevent various types of fires, such as, for example, Class A and Class B foams. In certain embodiments, the foam concentrate may include an aqueous film forming foam. In one or more embodiments, the foam concentrate may include water in an amount of at least 50, 60, or 70 percent by weight, and/or not more than 95, 90, 85, or 80 percent by weight. In certain embodiments, the foam concentrate may include an ether in amount of at least 1, 2, or 3 percent by weight, and/or not more than 20, 15, 10, or 8 percent by weight.

In certain embodiments, the foam concentrate may include water and one or more surfactants. The surfactants may include a hydrocarbon surfactant and/or a fluorosurfactant. In one or more embodiments, the foam concentrate may include water and an ether. In such embodiments, the ether may be a butyl ether. In certain embodiments, the butyl ether may include t-butyl ether and/or a monobutyl ether. In the same or alternative embodiments, the butyl ether may include propylene glycol t-butyl ether and/or diethylene glycol monobutyl ether. In various embodiments, the foam concentrate may include, water, an ether, and one or more surfactants. In certain other embodiments, the foam concentrate may include water and a surfactant. In one or more embodiments, the foam concentrate may include magnesium sulfate in an amount of at least 0.1, 0.2, or 0.4 percent by weight, and/or not more than 10, 5, or 3 percent by weight.

In one or more embodiments, it may be desirable to test the accuracy of the foam addition system 26. For example, in certain embodiments, a foam test system 10 may be utilized to test the accuracy of the foam addition system 26 without discharging any foam into the environment. As discussed in detail below, the foam test system 10 of FIG. 1 may allow one to determine the accuracy of the foam addition system 26 without the use of foam by employing a foam concentrate substitute, e.g., a test water stream, that includes water from the water tank 13 flowing through the foam metering device 15, and a flow control system 20 that may restrict the flow of foam concentrate into the foam metering device 15.

In certain embodiments, the foam test system 10 of FIG. 1 may include a flow meter 19. In one or more embodiments, the flow meter 19 may be mounted on a firefighting vehicle 91. In certain other embodiments, as discussed below with reference to FIG. 3, a flow meter may be may be mounted on a test apparatus that is separate from a firefighting vehicle.

The flow meter 19 of FIG. 1 may be any type of flow meter that is capable of measuring the flow of a liquid, and a specific flow meter can be chosen by one skilled in the art for a particular purpose. In certain embodiments, the flow meter 19 may be a magnetic flow meter, e.g., a high accuracy, direct measurement, nonintrusive magnetic flow meter. In one or more embodiments, the flow meter 19 may be positioned upstream of the foam metering device 15. In the same or alternative embodiments, the flow meter 19 may be positioned downstream of the water tank 13. In a preferred embodiment, the flow meter 19 may be positioned downstream of the water tank 13 and upstream of the foam metering device 15. For example, in the embodiment depicted in FIG. 1, the flow meter 19 may be positioned along conduit 28, which can be utilized to deliver a test water stream from the water tank 13 to the foam metering device 15. The flow meter 19 can be positioned at any other location in the foam test system 10 as long as the flow meter 19 is capable of measuring the total flow and/or flow rate of a fluid entering the foam metering device 15 as part of the foam test system 10. For example, in certain embodiments, the flow meter 19 may be positioned along conduit 29.

As discussed above, in certain embodiments, the foam test system 10 may include a flow control system 20. In such embodiments, the flow control system 20 may shift the foam addition system 26 between a normal mode and a test mode, where the normal mode may be used to meter foam into a tank water stream, and where the test mode may be used to meter a test water stream into a tank water stream. For example, in such embodiments, when the flow control system 20 is in the normal mode, fluid flow from the foam tank 18 to the foam metering device 15 may be permitted and fluid flow from the water tank 13 to the foam meter device 15 may be restricted, and when in the test mode, fluid flow from the water tank 13 to the foam metering device 15 may be permitted and fluid flow from the foam tank 18 to the foam metering device 15 may be restricted.

In one or more embodiments, the flow control system 20 may include a test water valve 16 and/or a foam concentrate valve 17. The test water valve 16 and the foam concentrate valve 17 may be any type of valves that are capable of controlling the flow of a fluid through such a valve. In certain embodiments, the test water valve 16 may be positioned within the foam test system 10 so as to be able to control the fluid flow of test water from the water tank 13 to the foam metering device 15. In such embodiments, the test water valve 16 may be positioned upstream of the foam metering device 15 and downstream of the water tank 13. For example, in the embodiment depicted in FIG. 1, the test water valve 16 may be coupled to conduits 27 and 28a so as to be able to permit and/or prevent test water to flow from the water tank 13 to the foam metering device 15, via conduits 27, 28a, 28b, and 29. The test water valve 16 may be positioned anywhere within the foam test system 10 and/or the foam addition system 26 as long as the test water valve 16 is capable of permitting and/or preventing water to flow from the water tank 13 to the foam metering device 15, via conduits 27, 28a, 28b, and 29.

In one or more embodiments, the foam concentrate valve 17 may be positioned within the foam test system 10 and/or the foam addition system 26 so as to be able to control the fluid flow of foam concentrate from the foam tank 18 to the foam metering device 15. In such embodiments, the foam concentrate valve 17 may be positioned downstream of the foam tank 18 and upstream of the foam metering device 15. For example, in the embodiment depicted in FIG. 1, the foam concentrate valve 17 may be coupled to conduits 31a and 31b so as to be able to permit and/or prevent foam concentrate to flow from the foam tank 18 into the foam metering device 15, via conduits 31a, 31b, and 29. The foam concentrate valve 17 may be positioned anywhere within the foam test system 10 and/or the foam addition system 26 as long as the foam concentrate valve 17 is capable of permitting and/or preventing water to flow from the foam tank 18 to the foam metering device 15, via conduits 31a, 31b, and 29.

As discussed above, when the foam addition system 26 is in the normal mode, fluid flow from the foam tank 18 to the foam metering device 15 may be permitted. In such embodiments, when in the normal mode, the foam concentrate valve 17 may be open so as to permit flow of the foam concentrate from the foam tank 18 into the foam metering device 15. Further, in such embodiments, when in the normal mode, the test water valve 16 may be closed so as to prevent the flow of the test water from the water tank 18 to the foam metering device 15. In certain embodiments, when the foam addition system 26 is in the normal mode, a foam/water mixing device 14, e.g., an eductor, may draw the liquid foam concentrate through the foam metering device 15. Further, in such embodiments, the foam concentrate exiting the foam metering device 15 may mix with a tank water stream in the foam/water mixing device 14. In one or more embodiments, this water and foam mixture may enter the pump 11 via conduit 23b and then proceed through conduits 22 and 24 to be discharged via at least one of the discharge outlets 25.

As discussed above, when the foam addition system 26 is in the test mode, fluid flow from the water tank 13 to the foam metering device 15 may be permitted. For example, when in the test mode, the test water valve 16 may be open so as to permit the flow of test water, e.g., a test water stream, from the water tank 13 to the foam metering device 15. Further, in such embodiments, when in the test mode, the foam concentrate valve 17 may be closed so as to prevent the flow of foam concentrate from the foam tank 18 into the foam metering device 15. In certain embodiments, when in the test mode, a foam/water mixing device 14, e.g., an eductor, may draw test water, e.g., a test water stream stream, through the foam metering device 15. Further, in such embodiments, the test water may mix with a tank water stream in the foam/water mixing device 14, and this mixture may pass through conduits 23b and 21b, through the pump 11, through conduits 22 and 24, and may be discharged via at least one discharge outlet 25.

As discussed above, the foam test system 10 may be used to test the accuracy of the foam addition system 26 without discharging foam into the environment, which, in certain embodiments, may include measuring the amount of a test water stream that flows through the foam metering device 15. In such embodiments, measuring the amount of a test water stream that flows through the foam metering device 15 may include measuring the flow rate and/or the total flow of the test water stream flowing through the foam metering device 15. In certain embodiments, the flow meter 19 of FIG. 1 may measure the flow rate and/or total flow of the test water stream that flows through the foam metering device 15. For example, in such embodiments, a test water stream from the water tank 13 on its way to the foam metering device 15, may pass through conduit 27, through the test water valve 16, and into conduit 28 where the flow meter 19 is positioned, thereby allowing the flow meter 19 to measure the flow rate and/or the total flow of the test water stream that flows through the foam metering device 15.

In certain embodiments, operating the foam addition system 26 in the test mode may include discharging a mixture of a test water stream and a tank water stream from at least one discharge outlet 25. In such embodiments, a user may measure the amount of the test water stream/tank water stream mixture discharged from the discharge outlet 25. In certain embodiments, a user may measure the amount of the test water stream/tank water stream mixture discharged from the discharge outlet 25 by measuring the flow rate and/or total flow of the test water stream/tank water stream discharged from the discharge outlet 25. Further, in certain embodiments, a user may determine the concentration of the test water stream in the test water stream/tank water stream mixture using the measured amount of the test water stream/tank water stream mixture discharged from the discharge outlet 25 and the measured amount of the test water stream flowing through the foam metering device 15. For example, as discussed below with reference to the embodiment depicted in FIG. 2, a user may determine the concentration of the test water stream in the test water stream/tank water stream mixture using: 1) the measured amount of the test water stream/tank water stream mixture discharged from the discharge outlet 25 during a specified time period; and 2) the total amount of the test water stream flowing through the foam metering device 15 during a specified time period.

Figure 2:
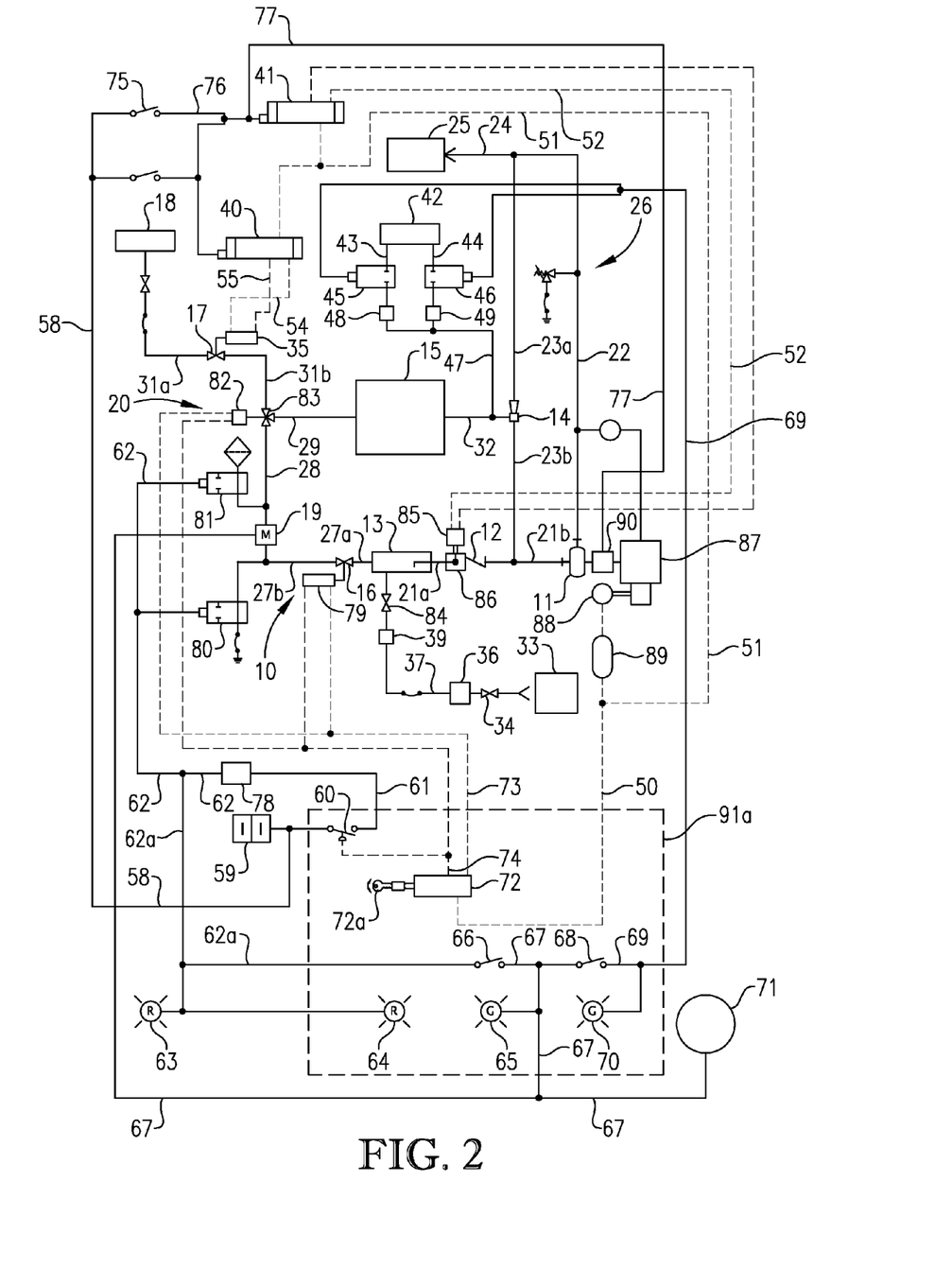
FIG. 2 is a schematic diagram of an internal foam test system in accordance with another embodiment of the present invention, particularly showing a water tank, a pump, a flow control system, a foam metering device, a flow meter, and a flow meter display.

FIG. 2 provides a more detailed depiction of an internal foam test system 10 for an ATP foam addition system 26 configured in accordance with one embodiment of the present invention. In certain embodiments, the components of the foam addition system 26, the foam test system 10, and/or the flow control system 20 of FIG. 2 may have the same properties and parameters as the same-numbered corresponding components of the foam addition system 26, the foam test system 10, and/or the flow control system 20 discussed above with reference to FIG. 1. Below, a detailed description of the operation of the foam test system 10 of FIG. 2 in the test mode is provided.

In certain embodiments, to operate the foam test system 10 of FIG. 2, a valve 34 may be opened allowing water from the water supply 33, e.g., a fire hydrant line, to flow through a meter 36, through a conduit 37, through a connection 39, and through the valve 84, and into the water tank 13. Further, in such embodiments, an engine 87 may be started, driving the air compressor 88 and sending air to the air tank 89, through conduit 50, through valve 72, and through conduit 73, thereby holding the actuator 79 on the test water valve 16 closed, and holding the actuator 82 on valve 83 in the default operational mode. Air may also pass through conduit 51, through valve 40, through conduit 54, thereby holding the actuator 35 on the foam concentrate valve 17 closed. In addition, in such embodiments, air may pass through valve 41 and through conduit 52, thereby holding the actuator 85 on valve 86 closed.

In one or more embodiments, the water switch 75, which may receive power from a battery 59 via conductor 58, can be activated "ON." In such embodiments, activating the water switch ON may allow power to go through the water switch 75 and through conductor 76 to activate valve 41, thereby allowing air from conduit 51 to flow through conduit 52 to the actuator 85 on valve 86 to open the valve 86. Further, in such embodiments, air may be exhausted from the actuator 85 through conduit 52 to the atmosphere. In such embodiments, power may also go through conductor 77 engaging the power take-off ("PTO") 90, and thereby activating the water pump 11. Further, in such embodiments, water may flow from the water tank 13, through conduit 21*a*, through valve 86, through check valve 12, through conduit 21*b*, through water pump 11, and into conduits 22 and 24.

In certain embodiments, the plumbing system, which, for example, may include conduits 21*a*, 21*b*, 22, and 24, may be purged of all air by opening the discharge outlets 25 until all air is expelled. In such embodiments, the discharge outlets 25 may then be closed and the water switch 75 can be turned "OFF." Further, in such embodiments, filling of the water tank 13 can continue until it over flows through a vent located thereon. In addition, once the water overflows through the water tank 13 vent, the valve 36 can be turned "OFF."

In one or more embodiments, the flow rate of each discharge outlet 25 may be tested by turning the water switch 75 "ON" and allowing water to flow through each discharge outlet 25 separately for a predetermined time. For example, in such embodiments, water may flow through the undertruck nozzles and handlines for 5 minutes, through the turret low flows for 2 minutes, and/or through the turret high flows for 1 minute. In such embodiments, after allowing each individual discharge outlet 25 to flow, e.g., for the above-mentioned predetermined time, the reading on the meter 36 can be recorded as the "Beginning Water Reading," prior to opening valve 34. Next, in such embodiments, valve 34 may be opened and the water tank 13 may be refilled until it over flows through the vent located thereon. In such embodiments, as soon as water is discharged from the vent on the water tank 13, the valve 34 may be closed and the reading on meter 36 can be recorded as the "Ending Water Reading." In such embodiments, the flow rate of each discharge outlet can be determined according to Formula I shown below.

$$((\text{Ending Water Reading} - \text{Beginning Water Reading})/\text{time of discharge}) = \text{Flow Rate} \qquad \text{I}$$

The flow rate determined according to Formula I can be in the units of volume units per minute, and can be recorded as the "Discharge Flow." In such embodiments, the process described above can be completed to determine and record the Discharge Flow for each discharge outlet, e.g., undertruck nozzles, handlines, turret low flows, and/or turret high flows.

In certain embodiments, the Foam Flow can be determined, which can be used along with the Discharge Flow to determine the concentration of the test water stream in the test water stream/tank water mixture. In such embodiments, to prepare the foam test system 10 and the foam addition system 26 to measure the Foam Flow, valve 72 can be turned "ON" by insertion and turning of a key 72*a*. In such embodiments, air from the air compressor 88 can flow through the air tank 89, through conduit 50, through valve 72, through conduit 74, to the actuator 79, thereby opening valve 16. In such embodiments, air can also flow to the actuator 82 thereby shifting valve 83 into the test mode. Further, air pressure from conduit 74 may close pressure switch 60, allowing power from battery 59 to travel through pressure switch 60, through conductor 61, through power conditioner 78, through conductor 62, thereby closing valves 80 and 81 and/or turning lights 63 and 64 on. In certain embodiments, the light 63 may be positioned inside the cab of a firefighting vehicle, while the light 64 may be positioned on an enclosure 91*a* separate from the cab of the firefighting vehicle. In addition, water may flow from the water tank 13, through conduit 27*a*, through valve 16, through conduit 27*b*, through meter 19, through conduit 28, through valve 83, through conduit 29, and into the foam metering device 15. In such embodiments, power may travel from conductor 62 to conductor 62*a*, thereby turning switch 66 "ON," which may allow power to travel through conductor 67, thereby turning on the light 65, activating the meter 19, and activating the meter display 71. Further, turning switch 66 "ON" can send power to switch 68, for the purposes discussed below.

In addition, it may be desirable to add a visual enhancement solution to the test water stream so a user can ensure that the test water stream has mixed with the tank water stream. For example, in such embodiments, once switch 68 is "ON," power may travel through conductor 69, which can turn on light 70 and activate either valve 45 or valve 46 depending on what discharge is activated. In such embodiments, a visual enhancement solution may then flow from the visual enhancement solution tank 42, through conduit 43 and/or 44, through valve 45 and/or 46, through orifices 48 and/or 49, through conduit 47, and into conduit 32, where the visual enhancement solution may mix with the test water stream exiting the foam metering device 15. The visual enhancement solution can be any type of solution known to one skilled in the art, as long as it is able to be mixed with the test water stream and be detected by a user. In one or more embodiments, the solution can be a common food coloring dye.

In certain embodiments, to begin the Foam Flow readings, the engine 87 may be started and the water switch 75 turned "ON." In such embodiments, power from battery 59 can flow through conductor 58, through the water switch 75, through conductor 76, thereby activating valve 41 and allowing air from conduit 51 to flow through conduit 52 and to the actuator 85 on valve 86 to open the valve 86. Further, in such embodiments, air may be exhausted from the actuator 85 through conduit 52 to the atmosphere. In addition, power may also flow through conductor 77, thereby engaging PTO 90 and activating the water pump 11. Further, in such embodiments, water, e.g., a tank water stream, may flow from the water tank 13, through conduit 21*a*, through valve 86, through check valve 12, through conduit 21*b*, through water pump 11, and into conduit 22. Water can also flow through conduit 23*a*, through eductor 14 (creating a low pressure area), through conduit 23*b*, into conduit 21*b*, through water pump 11, and back into conduit 22. At the same time, in such embodiments, a visual enhancement solution, e.g., a food coloring dye, may flow into conduit 32 as discussed above. Further, in such embodiments, opening a discharge 25 may open an orifice on the foam metering device 15, thereby allowing a metered volume of a test water stream to flow through the foam metering device 15, through conduit 32, mixing with the visual enhancement solution into eductor 14, then mix with the tank water stream flowing into conduit 23*b*, thereby allowing the meter 19 and the conduits 27b, 28, and 29 to be flooded with water. Further, in such embodiments, the water switch 75 can then be turned "OFF" and the reading on display 71 can be recorded as "Beginning Foam Reading." In such embodiments, the water switch 75 can then be turned "ON" and discharge 25 can be opened and allowed to flow for a predetermined time, e.g., for 5 minutes at the undertruck nozzles and handlines, for 2 minutes at the turret low flows, and for 1 minute at the turret high flows. After flowing each individual discharge 25 for a predetermined time, e.g., the time detailed above, the water switch 75 can be turned "OFF" and the reading on display 71 can be recorded as the "Ending Foam Reading." The Foam Flow (i.e., flow rate of the foam metering device 15) can be determined according to Formula II provided below.

$$\text{Foam Flow} = (\text{Ending Foam Reading} - \text{Beginning Foam Reading})/\text{time of discharge} \qquad \text{II}$$

In such embodiments, the Foam Concentrate Percentage can be determined according to Formula III provided below. In the embodiment depicted in FIG. 2, operating in the test mode, the Foam Concentrate Percentage measured relates to the concentration of the test water stream in the test water stream and tank water stream mixture, which may accurately reflect an actual foam concentrate percentage when the foam addition system 26 of FIG. 2 is operated in the normal mode.

$$\text{Foam Concentrate Percentage} = \frac{\text{Foam Flow}}{\text{Discharge Flow} * \text{time of discharge during Foam Flow}} * 100 \qquad \text{III}$$

In certain embodiments, the Foam Flow can be determined for each discharge outlet 25, e.g., the undertruck nozzles and handlines, the turret low flows, and the turret high flows, and then the Foam Concentrate Percentage can be determined for each of the discharge outlets 25 as discussed above.

In one or more embodiments, when all testing is complete, switches 66 and 68 can be turned "OFF" and the key 72a on valve 72 can be turned "OFF" and removed. In such embodiments, this will allow air to flow from conduit 50, through valve 72, through conduit 73, and to actuator 79, thereby closing test water valve 16. Further, air may also flow to actuator 82, thereby shifting valve 83 to the default operational mode. In such embodiments, air may be exhausted from actuator 82 and actuator 79 through valve 72 and conduit 74, which allows the pressure switch 60 to open, thereby disconnecting power to conductor 61 and turning off power conditioner 78. Further, in such embodiments, power to conductor 62 may also be turned off, thereby allowing valves 80 and 81 to open allowing water to drain from conduits 27b and 28, and from meter 19.

Figure 3:
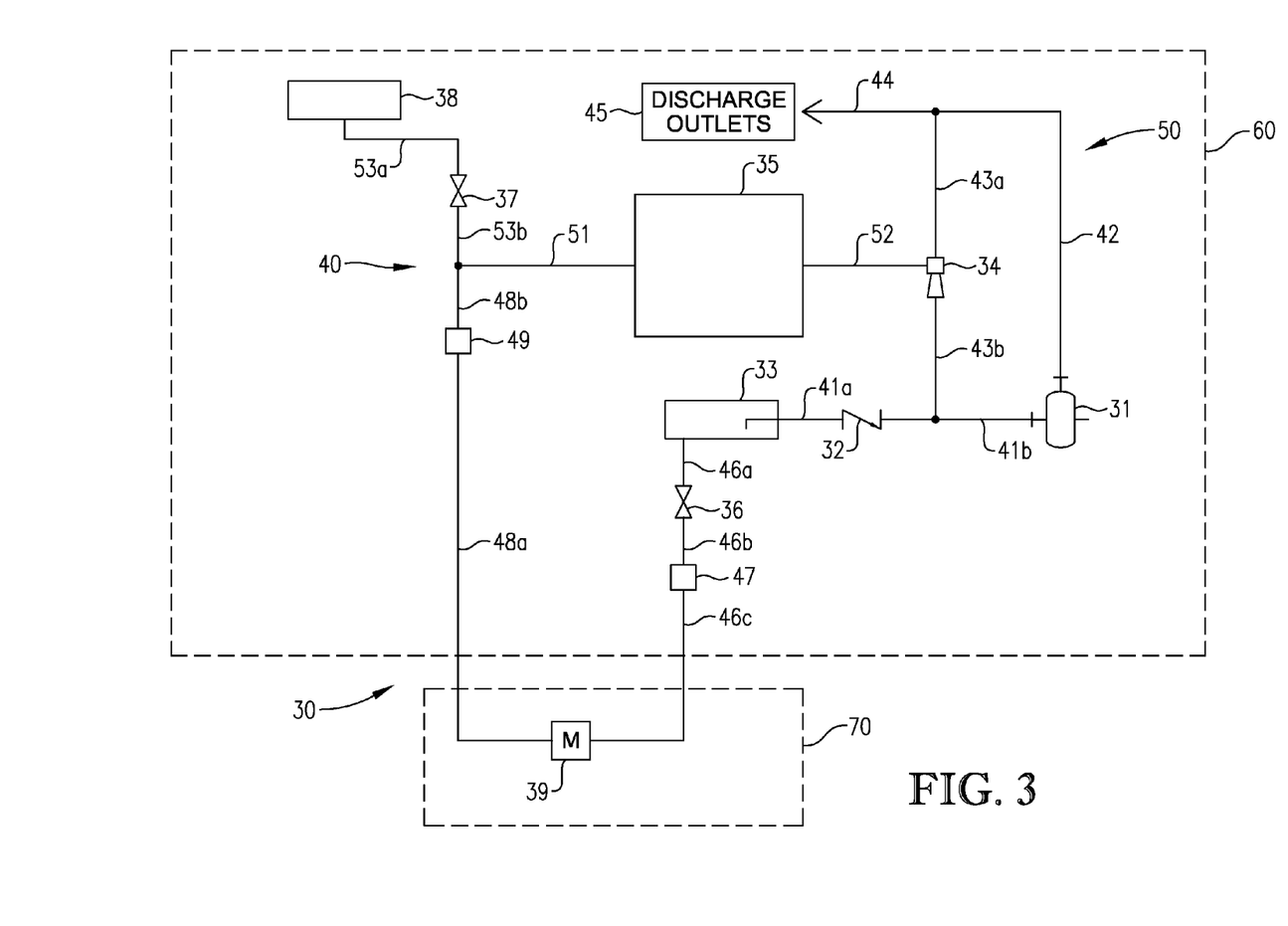
FIG. 3 is a schematic diagram of an external foam test system in accordance with yet another embodiment of the present invention, particularly showing a water tank, a pump, and a foam metering device, all mounted on a firefighting vehicle, and a flow meter mounted on a test apparatus separate from the firefighting vehicle.

FIG. 3 depicts an alternative embodiment of the foam test system 30 for a foam addition system 50, where one or more of the components of the foam test system 30 may be mounted on a test apparatus 70 separate from a firefighting vehicle 60. In one or more embodiments, the test apparatus 70 may be a mobile apparatus, such as, for example, a vehicle, trailer, or cart.

In one or more embodiments, the foam test system 30 may include a flow control system 40 that includes at least two fluid connectors for connecting and disconnecting the test apparatus 70 and the foam addition system 50. For example, as shown in the embodiment depicted in FIG. 3, a firefighting vehicle 60 may be equipped with water connections 47 and 49 that may permit external components of the foam test system 30, e.g., the flow meter 39, to be connected and disconnected from the foam addition system 50 via conduits 46c and 48a. The water connections 47 and 49 may be any type of water connections that are capable of connecting external components of the foam test system 30 to the foam addition system 50, and specific connections can be chosen by one skilled in the art for a particular purpose.

In certain embodiments, the test apparatus 70 may be used to test the foam addition systems of multiple different firefighting vehicles. For example, in an embodiment not depicted in the Figures, the test apparatus 70 may include multiple flow meters 39, with each flow meter 39 connected to a flow control system 40 for each firefighting vehicle 60. In certain other embodiments, the test apparatus 70 may include one flow meter 39 connected to multiple flow control systems 40 on multiple firefighting vehicles 60. In such embodiments, the flow meter 39 may be connected to multiple flow control systems in any manner known to one skilled in the art, such as, for example, via a three-way ball valve. In one or more embodiments, the test apparatus 70 may be mobile and can be relocated from firefighting vehicle to firefighting vehicle in order to perform foam testing. In certain other embodiments, the test apparatus 70 may be stationary and multiple different firefighting vehicles can be brought to the test apparatus 70 for foam testing. In such embodiments, the test apparatus 70 may include one flow meter 39 or multiple flow meters 39, as discussed above.

In certain embodiments, the foam test system 30, the foam addition system 50, and/or the flow control system 40 may operate in a manner similar to that of the respective foam test system 10, foam addition system 26, and flow control system 20 discussed above with reference to FIG. 1. Accordingly, in certain embodiments, the components of the foam test system 30, the foam addition system 50, and the flow control system 40 may have similar properties and parameters as discussed above regarding the respective components of the foam test system 10, foam addition system 26, and flow control system 20 discussed above with reference to FIG. 1. Below, a description of the operation of the foam addition system 50, flow control system 40, and foam test system 30 is provided.

In certain embodiments, to operate the foam addition system 50 in the normal mode, water, e.g., a tank water stream, from water tank 33 may enter conduit 41a, flow through check valve 32, through conduit 41b, through the pump 31, through conduits 42 and 43a, and into the water/foam mixing device 34. In such embodiments, foam concentrate may enter conduit 53a from the foam tank 38, flow through the foam concentrate valve 37, through conduit 53b, through conduit 51, and into the foam metering device 35. In such embodiments, the foam metering device 35 may meter foam concentrate into the conduit 52, where the foam concentrate can then be mixed with the tank water stream in the foam/water mixing device 34. In such embodiments, the foam and tank water mixture may then proceed through conduits 43b, 41b through the pump 31, through conduits 42 and 44, and through at least one discharge outlet 45.

In one or more embodiments, to operate the foam addition system 50 in the test mode, the test water valve 36 may be open so as to permit the measurement of the flow rate or total flow of the test water stream. For example, in such embodiments, a test water stream from the water tank 33 may flow through conduit 46a, through test water valve 36, through conduit 46b, through water connection 47, through conduit 46c, through the flow meter 39, through conduit 48a, through water connection 49, through conduits 48b and 51, and into the foam metering device 35. Further, in such embodiments, a tank water stream may flow through the foam/water mixing device 34 drawing the test water stream from the foam metering device 35 into the mixing device 34, and the resulting test water stream and tank water mixture can then proceed through conduits 43b, 41b, through pump 31, through conduits 42 and 44 to be discharged at a discharge outlet 45. In such embodiments, the flow meter 39 may be used to measure the flow rate or total flow of the test water stream being metered through the foam metering device 35 when in the test mode. In such embodiments, the foam concentrate valve 37 may have been closed to restrict the fluid flow of foam concentrate from the foam tank 38 into the foam mixing device 35.

In certain embodiments, the foam addition system 50, the foam test system 30, and the flow control system 40 may be present on a firefighting vehicle having similar components as those discussed above with reference to FIG. 2, with the exception that one or more components of the foam test system 30 may be external to the firefighting vehicle, such as, for example, the flow meter 39. In such embodiments, the foam concentration (or the concentration of the test water stream in a test water stream and tank water stream mixture) may be calculated for any discharge outlet 45 in the manner discussed above with reference to FIG. 2. For example, the Foam Flow and Discharge Flow of the foam addition system 50 may be determined using the firefighting vehicle discussed above with regard to FIG. 2, with the exception that the firefighting vehicle may employ water connectors 47 and 49 to connect the flow meter of the foam test system 30 on a test apparatus separate from the firefighting vehicle. In such embodiments, once the Foam Flow and Discharge Flow have been determined, one can determine the foam concentration (or the concentration of the test water stream in a test water stream and tank water stream mixture) for each discharge outlet 45 tested.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A foam system operable to be used with a firefighting vehicle that includes a water tank for storing water, a foam tank for storing a liquid foam concentrate, and a foam metering device for metering flow of the foam concentrate from the foam tank, the system comprising:
   a pressurized foam addition system that defines a continuous flow loop, mixes a foam-and-water mixture, continuously circulates the mixture along the flow loop, and discharges the mixture from the flow loop,
   said foam addition system including a foam/water mixing device located in the flow loop to introduce the metered flow of the foam concentrate from the foam metering device into the flow loop and thereby mix the foam concentrate with the water in the flow loop as the mixture circulates,
   said foam addition system including a pump in the flow loop to move the mixture through the flow loop in a flow direction,
   said foam addition system presenting a water inlet along the flow loop to receive water from the water tank, with the water inlet being located upstream of the pump and downstream of the mixing device relative to the flow direction,
   said foam addition system presenting a discharge outlet along the flow loop to discharge the mixture, with the discharge outlet being located downstream of the pump and upstream of the mixing device relative to the flow direction;
   a flow control system shiftable between (i) a normal mode where fluid flow from the foam tank to the foam metering device is permitted and fluid flow from the water tank to the foam metering device is prevented, and (ii) a test mode where fluid flow from the water tank to the foam metering device is permitted and fluid flow from the foam tank to the foam metering device is prevented; and
   a flow meter for measuring the amount of water passed through the foam metering device when the flow control system is in the test mode.

2. The foam test system according to claim 1, wherein the flow meter is mounted on a test apparatus separate from the firefighting vehicle.

3. The foam test system according to claim 2, wherein the test apparatus is a mobile apparatus.

4. The foam test system according to claim 2, wherein the flow control system comprises at least two fluid connectors for connecting and disconnecting the test apparatus and the foam addition system.

5. The foam system according to claim 1, wherein the flow meter is positioned upstream of the foam metering device.

6. The foam system according to claim 1, wherein the flow control system comprises a foam concentrate valve and a test water valve.

7. The foam system according to claim 6, wherein during the test mode the test water valve is open so as to permit flow of the test water stream from the water tank into the metering device, wherein during the test mode the foam concentrate valve is closed so as to prevent flow of the foam concentrate from the foam tank into the metering device.

8. The foam system according to claim 1, wherein the foam/water mixing device comprises an eductor, wherein during the normal mode the eductor draws the liquid foam concentrate through the foam metering device, wherein during the test mode the eductor draws the test water stream through the foam metering device.

9. The foam system according to claim 1, wherein the liquid foam concentrate comprises an aqueous film forming foam (AFFF).

10. A fire fighting vehicle comprising:
   a water tank for storing water;
   a foam tank for storing a liquid foam concentrate;
   a foam metering device for metering flow of the foam concentrate from the foam tank;
   a pressurized foam addition system that defines a continuous flow loop, mixes a foam-and-water mixture, continuously circulates the mixture along the flow loop, and discharges the mixture from the flow loop,
   said foam addition system including a foam/water mixing device located in the flow loop to introduce the metered flow of the foam concentrate from the foam metering device into the flow loop and thereby mix the foam concentrate with the water in the flow loop as the mixture circulates, said foam addition system including a pump in the flow loop to move the mixture through the flow loop in a flow direction, said foam addition system presenting a water inlet along the flow loop to receive water from the water tank, with the water inlet being located upstream of the pump and downstream of the mixing device relative to the flow direction, said foam addition system presenting a discharge outlet along the flow loop to discharge the mixture, with the discharge outlet being located downstream of the pump and upstream of the mixing device relative to the flow direction;

a flow control system shiftable between (i) a normal mode where fluid flow from the foam tank to the foam metering device is permitted and fluid flow from the water tank to the foam metering device is prevented, and (ii) a test mode where fluid flow from the water tank to the foam metering device is permitted and fluid flow from the foam tank and the foam metering device is prevented; and a flow meter for measuring the amount of water passed through the foam metering device when the flow control system is in the test mode.

11. The firefighting vehicle according to claim 10, wherein the flow meter is positioned upstream of the foam metering device.

12. The firefighting vehicle according to claim 10, wherein the flow control system comprises a foam concentrate valve and a test water valve.

13. The firefighting vehicle according to claim 12, wherein during the test mode the test water valve is open so as to permit flow of the test water stream from the water tank into the metering device, wherein during the test mode the foam concentrate valve is closed so as to prevent flow of the foam concentrate from the foam tank into the metering device.

14. The firefighting vehicle according to claim 10, wherein the liquid foam concentrate comprises an aqueous film forming foam (AFFF).

15. The firefighting vehicle according to claim 10, wherein the foam/water mixing device comprises an eductor, wherein during the normal mode the eductor draws the liquid foam concentrate through the foam metering device, wherein during the test mode the eductor draws the test water stream through the foam metering device.

* * * * *